United States Patent
Meng et al.

(10) Patent No.: US 9,853,491 B2
(45) Date of Patent: Dec. 26, 2017

(54) BATTERY PROTECTION DEVICE AND METHOD FOR DC POWER SUPPLY

(75) Inventors: Yanni Meng, Shenzhen (CN); Mingming Liu, Shenzhen (CN); Lingqiao Teng, Shenzhen (CN); Baohang Zhou, Shenzhen (CN); Shuwang Wei, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 954 days.

(21) Appl. No.: 13/979,660

(22) PCT Filed: Aug. 25, 2011

(86) PCT No.: PCT/CN2011/078926
§ 371 (c)(1),
(2), (4) Date: Jul. 15, 2013

(87) PCT Pub. No.: WO2012/097594
PCT Pub. Date: Jul. 26, 2012

(65) Prior Publication Data
US 2013/0300195 A1    Nov. 14, 2013

(30) Foreign Application Priority Data

Jan. 17, 2011   (CN) .......................... 2011 1 0009877

(51) Int. Cl.
*H02J 9/06*      (2006.01)
*H02J 7/34*      (2006.01)
*H02J 7/00*      (2006.01)

(52) U.S. Cl.
CPC   *H02J 9/06* (2013.01); *H02J 7/34* (2013.01); *H02J 9/062* (2013.01);
(Continued)

(58) Field of Classification Search
None
See application file for complete search history.

(56) References Cited

U.S. PATENT DOCUMENTS 6,476,519 B1 *  11/2002  Weiner ................... H02J 9/002
                                              307/23
6,573,621 B2 *   6/2003  Neumann ............. H02J 7/0044
                                             307/150
(Continued)

FOREIGN PATENT DOCUMENTS

CN       2728079 Y       9/2005
CN       1960110 A       5/2007
(Continued)

OTHER PUBLICATIONS

International Search Report for PCT/CN2011/078926 dated Sep. 20, 2011.

*Primary Examiner* — Rexford Barnie
*Assistant Examiner* — Swarna N Chowdhuri
(74) *Attorney, Agent, or Firm* — Ling Wu; Stephen Yang; Ling and Yang Intellectual Property

(57) ABSTRACT

Disclosed are a battery protection device and method for DC power supply. The device comprises: a first branch circuit unit and a second branch circuit unit; a monitoring unit is connected with a DC power supply, the first branch circuit unit and the second charge circuit unit respectively; the first branch circuit unit and the second branch circuit unit are connected in parallel, with one end connected to the DC power source and the other end connected to the load units in series via a battery unit; when the monitoring unit detects that the DC power supply supplies power normally, it controls the first branch circuit unit to conduct, the DC power supply supplies power to the load units; when the monitoring unit detects that the DC power supply supplies (Continued)

power abnormally, it controls the second branch circuit unit to conduct, the battery unit supplies power to the load units.

10 Claims, 6 Drawing Sheets

(52) U.S. Cl.
CPC . *H02J 2007/004* (2013.01); *H02J 2007/0037* (2013.01); *Y10T 307/344* (2015.04)

(56) References Cited

U.S. PATENT DOCUMENTS

| | | | |
|---|---|---|---|
| 7,573,232 | B2 | 8/2009 | Cheng et al. |
| RE45,897 | E * | 2/2016 | Naumann ................. B25F 5/00 |
| 2003/0062773 | A1 | 4/2003 | Richter et al. |
| 2013/0193768 | A1* | 8/2013 | Iwasaki .................... H02J 3/32 |
| | | | 307/85 |

FOREIGN PATENT DOCUMENTS

| | | |
|---|---|---|
| CN | 102075004 A | 5/2011 |
| DE | 3936638 C1 | 3/1991 |
| EP | 0966090 A2 | 12/1999 |
| GB | 1365149 A | 8/1974 |
| JP | 2007236017 A | 9/2007 |
| JP | 2011029010 A | 2/2011 |
| WO | 9850997 A1 | 11/1998 |

\* cited by examiner

US 9,853,491 B2

BATTERY PROTECTION DEVICE AND METHOD FOR DC POWER SUPPLY

TECHNICAL FIELD

The present document relates to battery protection technology for communication DC power supply, and more particularly, to a battery protection device and method for DC power supply.

BACKGROUND OF THE RELATED ART

Communication DC power supply is widely used in communication areas such as a variety of switching equipment, microwave communication, mobile base stations and optical fiber transmission, and it is the "heart" of communication equipment and has a very important position in the communication network. Once the power system fails and causes the traffic to disrupt, it will cause huge economic losses and social impacts, therefore, the reliability of the power supply system is particularly important, wherein, the battery acts as a backup power supply, in case that AC power is in outage, the battery can still provide uninterruptible power supply for the communications equipment. With the rapid development of the telecommunications industry in recent years, the established trunk cable, microwave unmanned stations, and mobile base stations use a lot of batteries. Therefore, the battery management is an important function of the power supply system, and the reliability and improvement of the battery maintenance and management is also the top priority of the design.

The batteries currently used in the communication industry are mostly VRLA (valve regulated lead-acid) batteries, in order to ensure that the batteries are not over-discharged, all the power supply systems have under-voltage protection capability, that is, a battery voltage protection threshold is set, and when the battery voltage drops to the protection voltage, the power supply of the battery is cut off. Generally, according to the importance of the communication equipment, the power supply system has the capability of two power-downs, in particular, when the AC power is interrupted, the battery is used to supply power to the loads, when the battery discharges to a certain extent, in order to ensure the power supply of the primary loads, it needs to automatically disconnect the secondary loads, so that the battery only supplies power to the primary loads, which is the first power-down; when the battery continues to discharge and reaches the protection point, the power supply circuit of the battery to the primary loads is cut off, which is the second power-down. Two power-downs can effectively extend the time length of supplying power to the primary loads, and protect the battery from damaging due to over-discharge at the same time. There are two methods for two power-downs in the Communication DC Power System: in the first method, the first power-down makes the secondary loads disconnect, and second power-down makes the primary loads disconnect, and this method makes the loads disconnect from the power supply circuit; and in the second method, first power-down makes the secondary loads disconnect, and the second power-down makes the battery disconnect, and this method remove the battery from the power supply circuit. Compared with the first method, in the second method, the primary loads always connect with the power supply circuit, so there is a certain risk-resistant ability for the wrong power-downs. The two methods are both based on protection philosophy of VRLA battery as well as battery discharge management. With the development of science and technology and the advance of electrochemical materials and process technology, many new batteries, such as lithium iron phosphate, etc., begin to enter the field of communication, and compared with lead-acid batteries, these batteries are not suitable to connect with the power supply system and stay in a state of long-term online floating charge after they are fully-charged, which makes the battery life shortened, therefore, the protections of these new batteries are different from the lead-acid batteries, and the current two power-down methods can not meet the protection needs of the new batteries.

SUMMARY OF THE INVENTION

The present document provides a battery protection device and method for a direct current (DC) power supply, to ensure, when the DC power supply is abnormal, smoothly switching to a battery for being powered without time delay, to ensure that a system can uninterruptedly supply power to a load and protection requirements of many types of batteries is compatible.

A battery protection device for DC power supply, comprising a monitoring unit, a DC power supply, a chargeable battery unit, and load units, further comprising: a first branch circuit unit and a second branch circuit unit;

said monitoring unit is connected with said DC power supply, said first branch circuit unit and said second branch circuit unit respectively;

said first branch circuit unit and said second branch circuit unit are connected in parallel, with one parallel end connected to said DC power supply, and the other parallel end connected in series with said load units through said battery unit;

when said monitoring unit detects that said DC power supply supplies power normally, it controls said first branch circuit unit to conduct, and said DC power supply supplies power to said load units;

when said monitoring unit detects that said DC power supply supplies power abnormally, it controls said second branch circuit unit to conduct, and said battery unit supplies power to said load units.

A battery protection method, comprising:

when a monitoring unit detects that a DC power supply supplies power normally, it controls a first branch circuit unit to conduct, and said DC power supply supplies power to said load units;

when said monitoring unit detects that said DC power supply supplies power abnormally, it controls a second branch circuit unit to conduct, and a battery unit supplies power to said load units;

in said battery protection device for DC power supply provided in the embodiment of the present document, the first branch circuit unit and the second branch circuit unit are connected in parallel, and one parallel-connected end is connected to said load units through said battery unit, and the other parallel-connected end is connected to said DC power supply, when said monitoring unit detects that said DC power supply supplies power normally, it controls said first branch circuit unit to conduct, and said DC power supply supplies power to said load units; when said monitoring unit detects that said DC power supply supplies power abnormally, it controls said second branch circuit unit to conduct, and said battery unit supplies power to said load units. The battery protection device with the first branch circuit unit and the second branch circuit unit is able to handle AC power outage emergencies, and can be smoothly switched to the battery for being powered without delay, thus ensuring that the system can uninterruptedly supply power to the load, and effectively protect the reliability and stability of the power supply of the system.

PREFERRED EMBODIMENTS OF THE INVENTION

The embodiment of the present document provides a battery protection device for communication DC power supply, which, through a rational distribution of the control units and the isolation units, achieves the compatibility of protective measures for a variety of batteries, thus meeting the protection requirements of the batteries to charge and discharge, effectively extending the battery life and contributing to save the overall system energy.

Figure 1A:
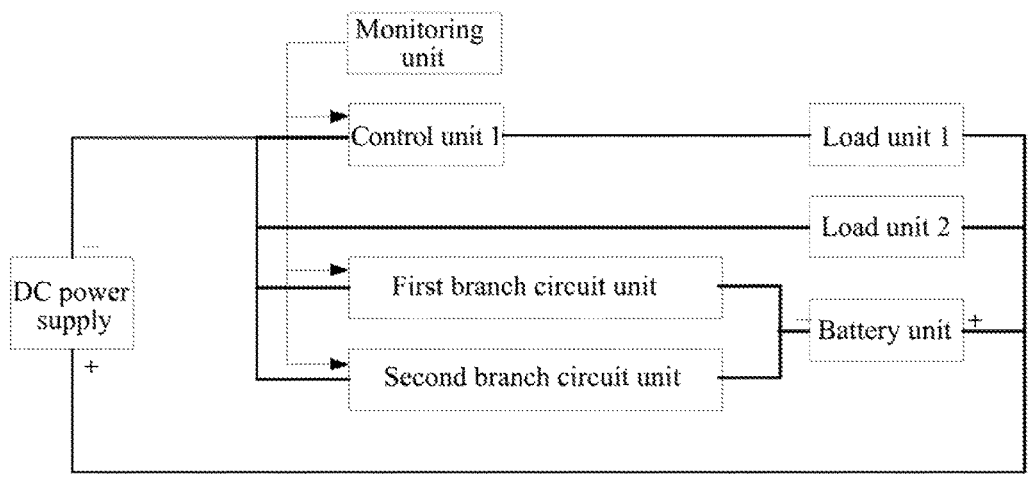
FIG. 1a is a block diagram of a battery protection device for DC power supply provided in an embodiment of the present document.

The embodiment of the present document provides a battery protection device for DC power supply, and as shown in FIG. 1a, the device comprises a monitoring unit, a DC power supply, a chargeable battery unit, and load units, and further comprises: a first branch circuit unit and a second branch circuit unit;

said monitoring unit is connected with said DC power supply, said first branch circuit unit and said second branch circuit unit respectively;

said first branch circuit unit and said second branch circuit unit are connected in parallel, with one parallel end connected to said DC power supply, and the other end connected in series with said load units through said battery unit;

when said monitoring unit detects that said DC power supply supplies power normally, it controls said first branch circuit unit to conduct, and said DC power supply supplies power to said load units;

when said monitoring unit detects that the power supply of said DC power supply supplies power abnormally, it controls said second branch circuit unit to conduct, and said battery unit supplies power to said load units.

Preferably, said first branch circuit unit comprises: said control unit 2 and said isolation unit 1 that are connected in series, when said DC power supply supplies power normally, said isolation unit 1 is in a conductive state; and when said DC power supply supplies power abnormally, said isolation unit 1 is in a non-conductive state;

said second branch circuit unit comprises: said control unit 3 and said isolation unit 2 that are connected in series, when said DC power supply supplies power normally, said isolation unit 2 is in the non-conductive state (that is, cut-off state). When said DC power supply supplies power abnormally, said isolation unit 2 is in the non-conductive state;

Preferably, said isolation units 1 and 2 are components which have characteristics of being conductive in the forward direction and cut-off in the reverse direction, and the working states of said isolation units 1 and 2 are opposite when said DC power supply supplies power normally.

Preferably, said isolation units 1 and 2 are diode components which have characteristics of being conductive in the forward direction and cut-off in the reverse direction, and in particular, said isolation unit 1 is a first diode, and said isolation unit 2 is a second diode specifically, and the conductive directions of said first and second diodes are opposite when said DC power supply supplies power normally.

Preferably, when the monitoring unit detects that said DC power supply supplies power normally and said battery unit is fully charged, and the type of battery is a type that does not support online floating charge, it controls the control unit 2 of the first branch circuit unit to switch off; when said monitoring unit detects that said DC power supply supplies power normally and the battery is charging, it controls the control unit 2 of the first branch circuit unit to switch on, and said DC power supply supplies power to said load unit and charges said battery unit;

This can achieve the compatibility of a variety of batteries, and meet the protection requirements for the battery to charge and discharge, effectively extend the battery life, and contribute to save the overall system energy.

Preferably, said load units comprise the primary loads and the secondary loads, when said monitoring unit detects that the voltage of said battery unit drops to a voltage of a first power-down, it controls said battery unit to supply power only to the primary loads.

Preferably, said load units comprise: said load unit 1 and said load unit 2, and said load unit 1 is connected with said control unit 1, and when said monitoring unit detects that the voltage of said battery unit drops to a voltage of the first power-down, it controls said control unit 1 to switch off.

In the following, the device and method of the present document will be described in further detail with combination of the accompanying figures. It should be noted that each battery unit in the embodiment of the present document is a chargeable battery unit.

The First Embodiment

Figure 1B:
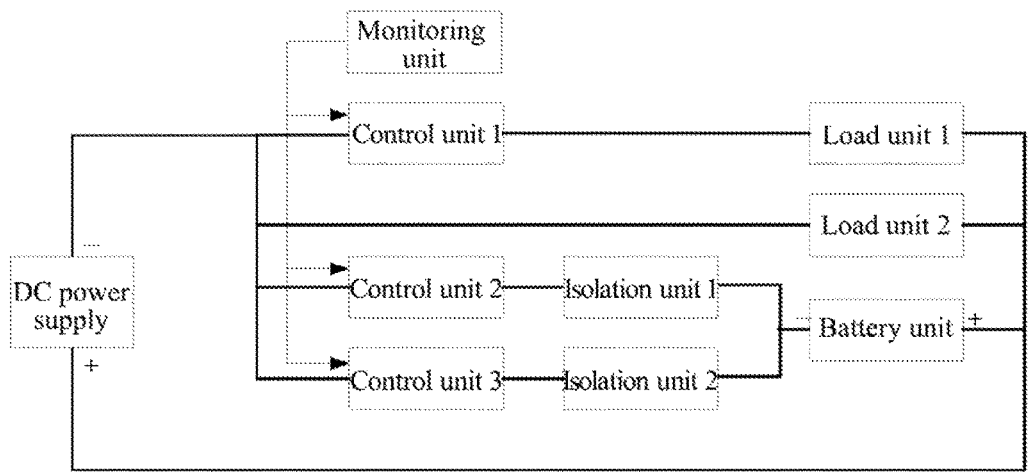
FIG. 1b is a specific structural diagram of a battery protection device for DC power supply provided in an embodiment of the present document.

The embodiment of the present document provides a battery protection device for DC power supply, as shown in FIG. 1b, comprising: the control units 1 to 3, the monitoring unit, the isolation units 1 and 2, the load units 1 and 2, and the battery unit. Wherein:

the control 1 and the load unit 1 constitute a series branch circuit, with one end connected to the negative electrode of the DC power supply, and the other end connected to the positive electrode of the DC power supply, and the control unit 1 is used to control whether the load unit 1 is connected to the DC power supply or not;

the control unit 2 and the isolation unit 1 constitute a series branch circuit, with one end connected to the negative electrode of the DC power supply, and the other end connected to the negative electrode of the battery unit through the isolation unit 1, and the control unit 2 is used to control whether the battery unit and the isolation unit 1 are connected to the negative electrode of the DC power supply or not;

the control unit 3 and the isolation unit 2 constitute a series branch circuit, with one end connected to the negative electrode of the DC power supply, and the other end connected to the negative electrode of the battery unit through the isolation unit 2, and the control unit 3 is used to control whether the battery unit and the isolation unit 2 are connected to the DC power supply or not;

the positive electrode of the battery unit is connected to the positive electrode of the DC power supply;

one end of the load unit 2 is connected to the positive electrode of the DC power supply, and the other end is connected to the negative electrode of the DC power supply;

the monitoring unit is used to monitor the working state of the DC power supply and the battery unit, and send control commands to the control unit 1, the control unit 2, and the control unit 3, and control the switch-on and switch-off of the control units 1, 2 and 3.

Among them, the load unit 1 is a secondary load, and the load unit 2 is a primary load;

preferably, the isolation units 1 and 2 are controlled by the current flow direction, wherein: the isolation unit 1 is conducted when the current flows from the negative electrode of the battery unit to the control unit 2, and is cut-off when the current flows in the opposite direction (that is, the current flows from the control unit 2 to the negative electrode of the battery unit). The isolation unit 2 is cut-off when the current flows from the negative electrode of the battery unit to the control unit 3, and is conducted when the current flows in the opposite direction (that is, the current flows from the control unit 3 to the negative electrode of the battery unit).

Specifically, the isolation unit 1 is the diode 1, and the positive electrode of the diode 1 is connected to the negative electrode of the battery unit, the negative electrode of the diode 1 is connected to the negative electrode of the DC power supply; the isolation unit 2 is the diode 2, and the negative electrode of the diode 2 is connected to the negative electrode of the battery unit, and the positive electrode of the diode 2 is connected to the negative electrode of the DC power supply.

Wherein, the control unit may be embodied as a controllable switch, a mono-stable DC contactor, or a bi-stable DC contactor, as long as it is a device that has the capability of switch-on and switch-off.

Figure 2:
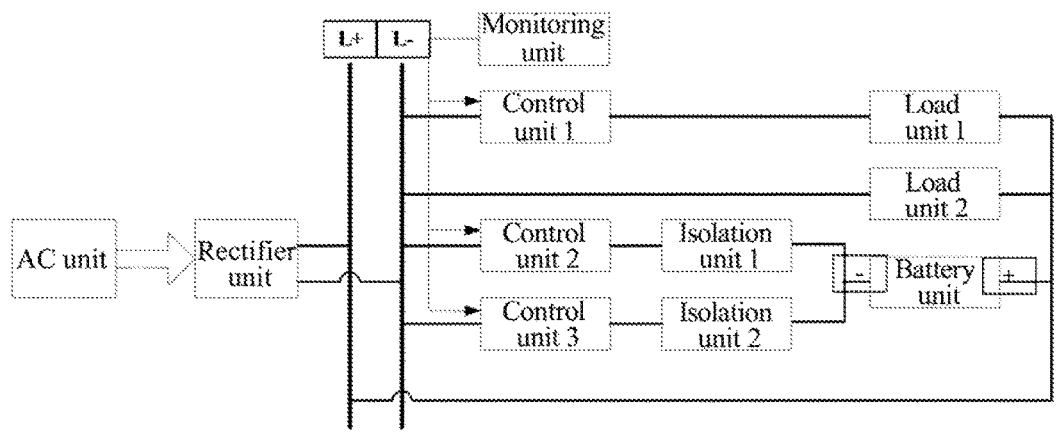
FIG. 2 is a schematic diagram of a battery protection device for −48V communication DC power supply provided in an embodiment of the present document.

In the following, the function of each unit will be introduced in detail with combination of the accompanying figures. A −48V communication DC power supply is taken as an example. FIG. 2 is a schematic diagram of a battery protection device for a −48V communication DC power supply provided in an embodiment of the present document.

An AC unit: implement the AC input and distribution;

A rectifier unit is connected to the AC unit, converts AC power to DC power and provides DC power to the communication equipment, and in FIG. 2, the positive electrode of the DC power supply is L+, and the negative electrode of the DC power supply is L−, when the communication DC power supply is −48V, that is, L+ is 0V, L− is −48V, the DC power is provided to the communication equipment;

The load units 1 and 2 comprise single-path load unit or multi-path load unit, and load protection devices (such as miniature circuit breakers or fuses); wherein the load unit 1 is a secondary load, and the load unit 2 is a primary load;

The battery unit consists of a single pack of batteries or multiple packs of batteries, and the battery protection devices (that is, miniature circuit breakers or fuses), and the batteries comprise VRLA batteries, gel batteries, lithium iron batteries, and so on.

The control units (1, 2, 3) is responsible for disconnecting or connecting the actuator of the load units and the battery unit, and the action commands are from the monitoring unit.

The monitoring unit comprehensively evaluates and determines the action commands of the control unit according to the battery type, the battery voltage, and the DC power supply. Therefore, the monitoring unit allows setting the battery type and two-level protection (that is, the voltage of the first power-down and the voltage of second power-down) of the battery unit according to the actual situation.

The monitoring unit controls the working states of the control units 1, 2 and 3 based on the working states of the DC power supply and the battery unit. During the control, it also refers to the type of the battery unit.

The isolation units are used to control the power flow direction to ensure that it can be conductive in the forward direction, and cut-off in the reverse direction, which is similar to the diode, in FIG. 2, the control directions of the isolation unit 1 and the isolation unit 2 are opposite, and the isolation units can determine whether the device is current conductive or cut-off according to the direction of current flow.

The Second Embodiment

In the following, how to control the working states of the control units 1, 2 and 3 according to the working states of the DC power supply and the monitor unit will be described in detail with combination of the accompanying figures.

Among them, the working states of the communications DC power supply and the battery unit are specifically divided into:

The first working state, wherein the DC power supply supplies power normally and the battery unit is fully charged;

The second working state, wherein the DC power supply stops supplying power and the battery unit supplies power;

The third working state, wherein the DC power supply stops supplying power and the battery unit is in a state of protection;

The fourth working state, wherein the DC power supply supplies power normally and the battery unit is charging.

Specifically:

1) when the monitoring unit determines that the system is currently in the first working state, that is, when the monitoring unit determines that the DC power supply supplies power normally and the battery is fully charged, it controls the control unit 1 and the control unit 3 to switch on, and the control unit 2 to switch off.

Preferably, when the monitoring unit controls the working state of the control unit 2, it can also refer to the type of the battery unit, if the monitoring unit determines that the battery type is a battery type that does not support the online floating charge (such as lithium iron battery), it controls the control unit 2 to switch off, and if the battery type is a battery type that supports online floating charge, it can control the control unit 2 to switch on or switch off.

The battery type of supporting the online floating charge is specifically: the battery life is not affected when the battery is fully charged while is still connected to the power supply, such as lead-acid battery.

the battery type of not supporting online floating charge is specifically: the battery life is affected when the battery is fully charged while is still connected with the power supply, such as a new lithium iron battery.

Figure 3:
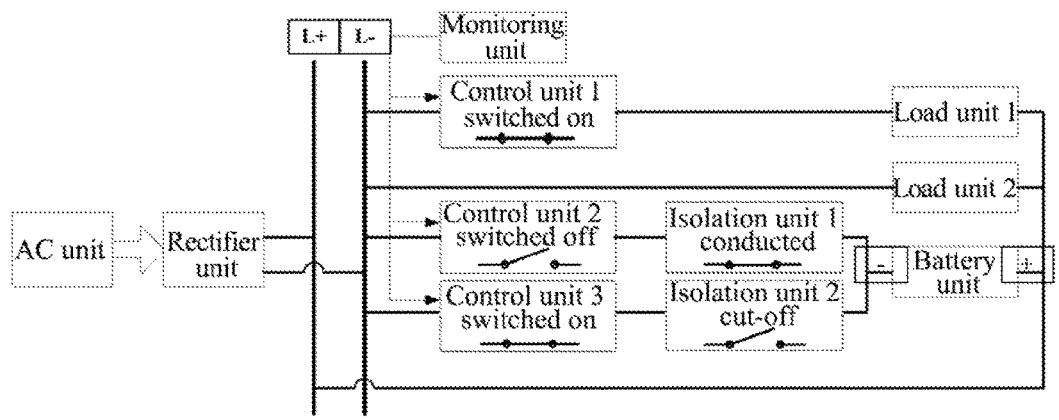
FIG. 3 is a schematic diagram of non-online floating charge of a lithium iron battery in a first working state.
Figure 4:
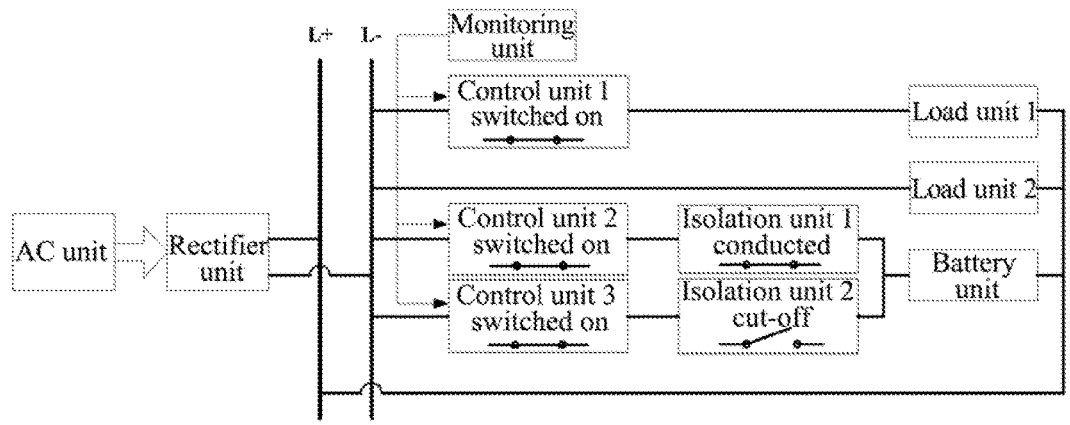
FIG. 4 is a schematic diagram of online floating charge of a general battery in a first working state.

At this time, the load units 1 and 2 are powered by the DC power supply, and since the voltage of the DC power supply is higher than the voltage of the battery, the isolation unit 1 is conductive in the forward direction, and the isolation unit 2 is cut-off in the reverse direction, therefore, the series branch consisted of the control unit 3 and the isolation unit 2 is in a disconnected state;

FIG. 3 shows a diagram of non on-line floating charge when the lithium iron battery is in the first working state, and FIG. 4 shows a diagram of on-line floating charge when a general battery is in the first working state.

2) when the monitoring unit determines that the system is currently in the second working state, that is, when the monitoring unit determines that the DC power supply stops supplying power and the battery unit supplies power, it controls the control unit 1 and the control unit 3 to remain switched on. Meanwhile, it controls the control unit 2 to switch on. The switch-on of the control unit 2 can start to charge the battery unit instantly when the AC power supply returns to power.

Figure 5:
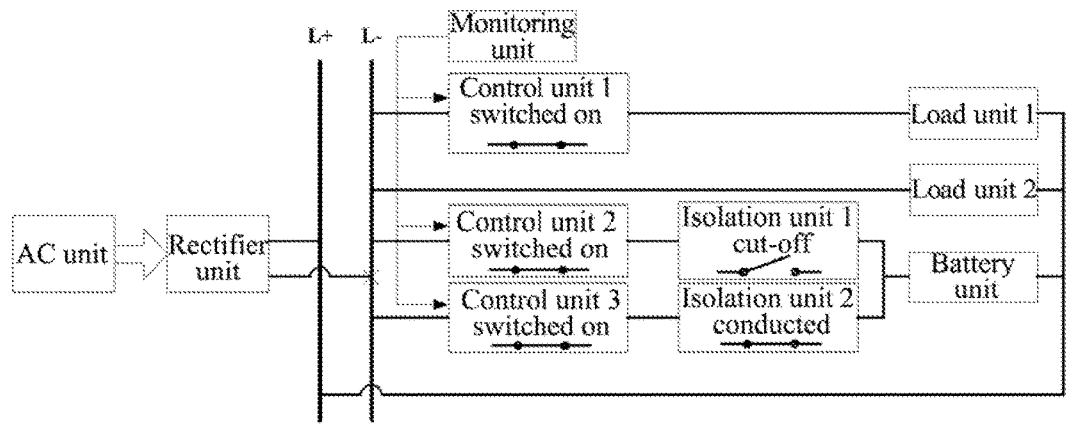
FIG. 5 is a schematic diagram that a DC power supply unit stops supplying power while the battery unit supplies power.

FIG. 5 shows a schematic diagram that the DC power supply stops supplying power and the battery supplies power; when the DC power is in outage, even if the lithium iron battery is in the off-line floating charge state, the system will immediately switch to the battery unit to supply power to the load, thus continuously supplying power to the load. At this time, the voltage of the battery unit is higher than the voltage of the system, the isolation unit 2 is in the forward conducted state and the isolation unit 1 is in the reverse cutoff state, the series branch consisted of the control unit 2 and the isolation unit 1 is in the disconnected state. Therefore, no matter what type of battery is used, the battery unit supplies power to the load units through the series branch consisted of the control unit 3 and the isolation unit 2. In this working state, the monitoring unit 2 controls the control unit 2 to switch on, which ensure to instantly charge the battery unit when the DC power supply resumes to supply power.

3) when the monitoring unit determines that the system is currently in the third working state, that is, when the monitoring unit determines that the DC power supply stops working while the battery protection is performed, it controls the control unit 1 to switch off and the control unit 2 to switch on, meanwhile, the state of the control unit 3 is determined according to the voltage of the battery unit. When the voltage of the battery is between the voltage of the first power-down and the voltage of the second power-down, the monitoring unit controls the control unit 3 to switch on, when the voltage of the battery drops to the voltage of the second power-down, it controls the control unit 3 to switch off.

Figure 6:
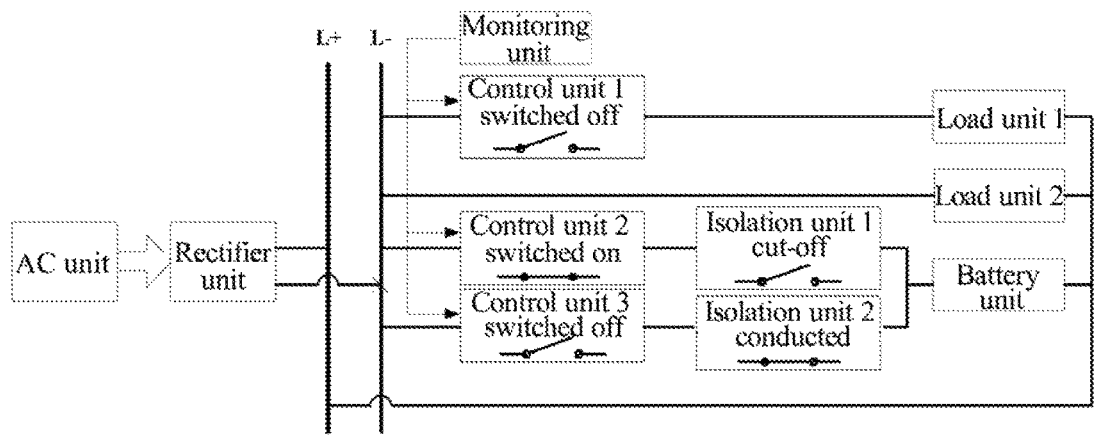
FIG. 6 is a schematic diagram that the DC power supply stops supplying power while the battery is in the state of protection.

FIG. 6 shows the schematic diagram that the DC power supply stops supplying power and the battery is in the protection state, after the DC power supply stops supplying power for a period of time, and when the voltage of the battery unit drops to the voltage of the first power-down, the monitoring unit controls the control unit 1 to switch off, at this time, the load unit 1 is removed from the power supply system, the control unit 2 and the control unit 3 are still switched on, and the battery unit only supplies power to the load unit 2. When the voltage of the battery unit drops to the voltage of the second power-down, the monitoring unit then controls the control unit 3 to switch off, moreover, since the series branch consisted of the control unit 2 and the isolation unit 1 is in the disconnected state, and the battery stops supplying power to the primary load, thus preventing the battery from over-discharged.

4) When the monitoring unit determines that the system is currently in the fourth working state, that is, when the monitoring unit determines that the DC power supply is normal and the battery is charging, it controls the control unit 2 to remain switched on, and controls the states of the control units 1 and 3 according to the voltage state of the battery unit. When the voltage of the battery unit is lower than the voltage of the second power-down, it controls the control unit 1 to switch off, and the control unit 3 to remain switched off; when the voltage value of the battery unit is between the voltage of the first power-down and the voltage of the second power-down, it controls the control unit 1 to switch on, the control unit 3 to switch off, when the battery unit is fully charged, it controls the control unit 3 to switch on.

When the monitoring unit determines that the DC power supply supplies power normally and the battery unit is charging, and when the voltage of the battery unit is lower than the voltage of the second power-down, it controls the first control unit to switch off, so that the DC power supply unit does not supply power to the first load unit, and it controls the second control unit to switch on, and the DC power supply charges the battery unit through the first branch circuit unit;

When the monitoring unit determines that the DC power supply supplies power normally and the battery unit is charging, and the voltage of the battery unit is between the voltage of the first power-down and the voltage of the second power-down, it controls the first control unit to switch on, and the DC power supply supplies power to the first load unit, and it controls the second control unit to remain switched on;

When the monitoring unit determines that the DC power supply supplies power normally and the battery unit is charging, and the battery unit is fully charged, it controls the first and third control units to switch on.

Figure 7A:
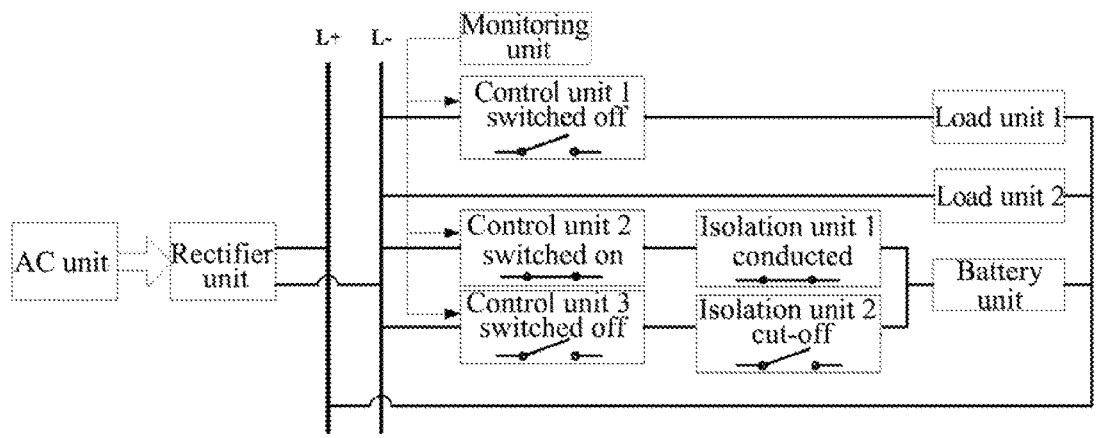
FIG. 7a and FIG. 7b are schematic diagrams that the DC power supply supplies power normally while the battery is in charging.
Figure 7B:
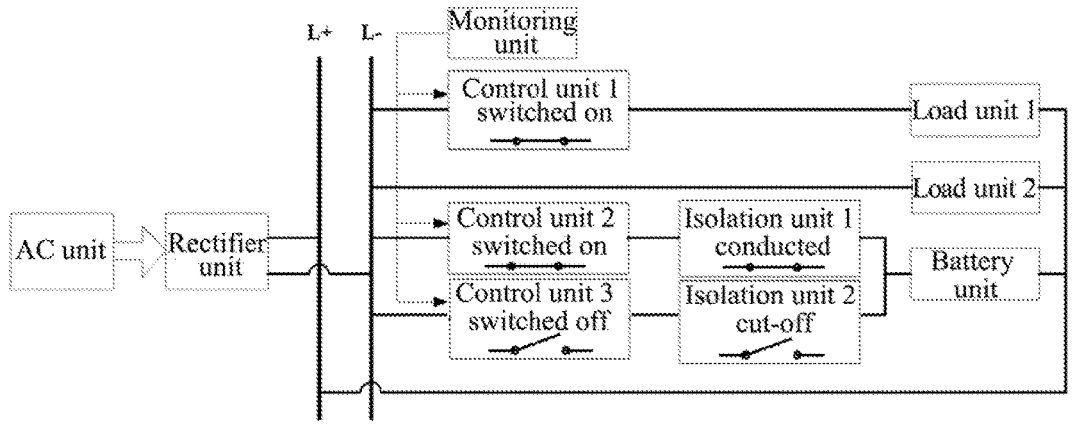

FIG. 7a and FIG. 7b are schematic diagrams that the DC power supply supplies power normally and the battery is charging, wherein, the voltage of the battery unit in FIG. 7a is lower than the voltage of the second power-down, and the voltage of the battery unit in FIG. 7b is between the voltage of the first power-down and the voltage of the second power-down; when the DC power supply returns to normal, the battery units need to be re-incorporated into the system. In the conventional battery circuit, if the voltage of the battery unit and the voltage of the DC power supply have a great difference, at the instant that battery is connected, it is easy to make the connected device have arc discharge, hence, the output voltage of the DC power supply needs to be adjusted to be as close to the voltage of the battery unit as possible, and then the battery is connected. In the present document, if the DC power returns to normal, the output voltage of the DC power supply is higher than the voltage of the battery unit, and the isolation unit 1 is in the conductive state, and the series branch consisted of the control unit 2 and the isolation unit 1 charges the battery unit, if the voltage of the battery power supply is lower than the voltage of the first power-down, the monitoring unit controls the control unit 1 to switch off, and until the voltage of the battery unit reaches the voltage of the first power-down, the monitoring unit controls the control unit 1 to switch on to start to supply power to the load unit 1, when the voltage of the battery unit is fully charged, it controls the control unit 3 to switch on, and at this time, the system returns to the first working state.

In the second embodiment, the second working state, in which the DC power supply stops supplying power while the battery unit supplies power, specifically refers to: the DC power supply stops supplying power, and at this time, the voltage of the battery unit is higher than the voltage of the first power-down. The third working state, in which the DC power supply stops supplying power while the battery unit is in a state of protection, means: the DC power supply stops supplying power, and the voltage of the battery unit equals to or is lower than the voltage of the first power-down.

It should be noted that the voltage protection in the present document is the under-voltage protection based on battery discharge, aiming to the cases that the new batteries, such as iron batteries, are sensitive to over-voltage and high temperature, when the AC is normal, with the control unit 2 being isolated from the battery and the power system, the system can be powered immediately via the series branch consisted of the control unit 3 and the isolation unit 2 when the AC power is in outage.

The Third Embodiment

Figure 8:
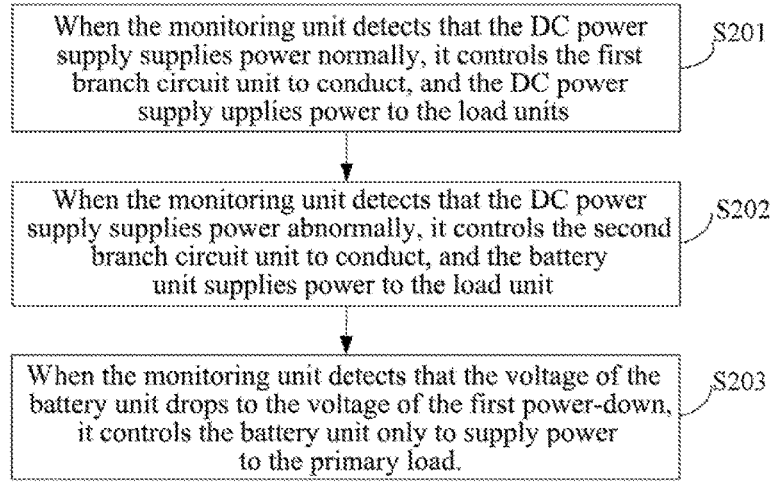
FIG. 8 is a flow chart of a battery protection method for DC power supply provided in an embodiment of the present document.

This embodiment of the present document provides a battery protection method for DC power supply, as shown in FIG. 8, comprising:

In S201, when the monitoring unit detects that the DC power supply supplies power normally, it controls the first branch circuit unit to conduct, and the DC power supply supplies power to the load units;

Preferably, the monitoring unit further controls the first branch circuit unit to switch off according to the battery type, and when the battery type does not support the on-line floating charge, it controls the first branch circuit to switch off.

When the monitoring unit detects that the DC power supply supplies power normally, it controls the control units 2 and 3 to switch on, since the isolation unit 1 is in the conductive state, the first branch circuit unit is conductive, if when the battery type does not support the on-line floating charge, it makes the first branch circuit unit disconnect by controlling the control unit 2 to switch off. Since the isolation unit 2 at this time is in a non-conductive state, the second branch circuit unit is disconnected.

In S202, when the monitoring unit detects that the DC power supply supplies power abnormally, it controls the second branch circuit unit to conduct, and the battery unit supplies power to the load unit.

When the monitoring unit detects that the DC power supply supplies power abnormally, it still remains the control unit 3 switched on, and at this time, the isolation unit 2 is conducted, and the battery unit supplies power to the load unit via the second branch circuit unit.

The above-mentioned method further comprises:

In S203, when the monitoring unit detects that the voltage of the battery unit drops to the voltage of the first power-down, it controls the battery unit only to supply power to the primary load.

Specifically, please refer to the description of the second embodiment for the specific control method for the monitoring unit controlling the working state of the control units 1, 2 and 3 according to the current working state of the DC power supply and the battery unit, and the control method is not described in detail here.

With the device and method in accordance with the embodiments of the present document, the following advantages can be obtained:

1) with a rational distribution of the control units and the isolation units, it achieves the compatibility of protective measures of various types of batteries, and it meets the protection requirements for the battery to charge and discharge, effectively extends the battery life, and contributes to overall system performance.

2) it is able to respond to AC power outrage emergencies while realizing the battery charging protection, and AC power can smoothly switch to battery power without delay, which ensures to uninterruptedly supply power to the load, and effectively guarantees the reliability and stability of the system power supply.

3) the current battery discharge protection is two power-downs, in order to avoid the sparking due to the voltage difference when the battery accesses the device when restoring the battery to power on, it requires long-term and slow regulation for fitting, and then the battery accesses the system for charging, while the protection device according to the present document can directly make the battery access device directly for charging by conducting the isolation units when the battery restores from the second power-down, thus there is no risk of damaging caused by the battery accessing the device, meanwhile, the battery unit can be charged as soon as possible.

The Fourth Embodiment

In the following, in combination with the accompanying drawings and the specific embodiments, the technical scheme of the present document will be described in further detail.

Figure 9:
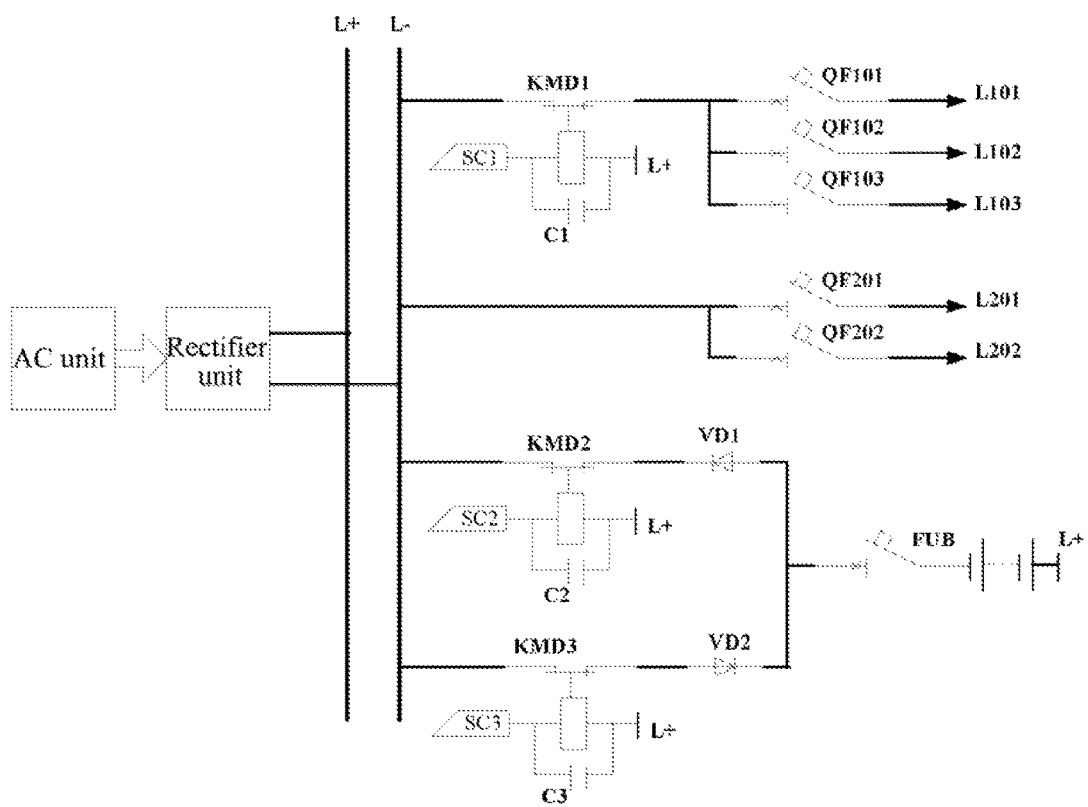
FIG. 9 is a schematic diagram of a battery protection device for a communication base station.

FIG. 9 is a schematic diagram of the battery protection device of the communication base station, a certain communication base station is taken as example, the AC input of the communication DC power supply of this base station is 220V, with the single-phase 220V rectifier module, the DC output is −48V (that is, the DC power supply is −48V). The load unit 1 is a 3-way load, and the load protection devices are miniature circuit breakers QF101~QF103; the load unit 2 is a 2-way load, and the load protection devices are miniature circuit breakers QF201 and QF202; the battery unit is a pack of 500 Ah iron-lithium batteries, and the battery short protection device is fuse FUB; the control units 1, 2 and 3 are mono-stable and normally-connected DC contactors KMD1~KMD3, the control commands of the monitoring unit are sent to the control unit through SC1~SC3; the isolation units adopt diodes VD1 and VD2 whose voltage level can meet the power supply unit. The monitoring unit sets the charging voltage of the battery unit as 56.4V, the floating-charge voltage of the battery unit as 53.5V, the voltage of the first power-down as 46V, and the voltage of the second power-down as 45V.

1) when the AC power supply is in normal and the battery is fully charged, the DC contactors KMD1 and KMD3 do not operate and remain in the normally closed state, L101 L103 and L201~L202 are normally powered by the system. The system output voltage is slightly higher than the battery voltage, and VD1 is in the forward conductive state while the VD2 is in the reverse cutoff state, the series branch consisted of KMD3 and VD2 is in the disconnected state. Due to the use of lithium iron batteries, the KMD2 action can be controlled to make the battery separate from the system.

2) In the initial stage of the AC power outage, the system switches to the battery unit to supply power to the load unit. The voltage of the battery unit is higher than the voltage of the system, and the VD2 is in the forward conducted state, while the VD1 is in the reverse cutoff state, and the series branch consisted of KMD2 and VD1 is in the disconnected state. The battery unit supplies power to the system through the series branch of KMD3 and VD2. Considering that it needs to charge the battery after the AC resumes to supply power, KMD2 does not operate at this time and returns to the switched-on state.

3) after the AC power is in outage for a period of time, and when the voltage of the battery drops to 46V, the monitoring unit controls KMD1 to switch off, and the loads L101~L103 are removed from the power supply system, then the system only supplies power to the primary load. When the voltage of the battery drops to 45V, the monitoring unit controls KMD3 to switch off, and the battery stops supplying power to the primary loads L201-L202, to prevent the battery from over-discharged.

4) after the AC returns to the normal state, the battery unit needs to be re-incorporated into the system. The VD1 is in the forward conducted state, and charges the battery unit through the series branch of KMD2 and VD1, meanwhile, it supplies power to the primary loads L201 and L202. Until the voltage of battery reaches 46V or more, the monitoring unit controls the KMD1 to not act and to return to the switched-on state, and it starts to supply power to the loads L101~L103. Until the battery unit is fully charged (or the voltage of the battery and the output voltage of the system rectifier are similar), it controls the KMD3 to return to the switched-on state.

In the above-mentioned embodiment, the AC being normal means that the DC power supply supplies power normally, and the AC stopping means that the DC power supply stops supplying power. Moreover, the system voltage is the voltage of the DC power supply.

Obviously, a person skilled in the art can make various modifications and variations of the present document without departing from the spirit and scope of the invention. Thus, if these modifications and variations of the present document belong to the scope of the claims and their equivalents of the present document, the present document intends to include these modifications and variations.

INDUSTRIAL APPLICABILITY

With the present document, the communications equipment is able to handle the AC outage emergencies, and can be smoothly switched to the battery for being powered without delay, which ensures that the system can uninterruptedly supply power to the load, and effectively guarantees the reliability and stability of the power system, meanwhile, effectively extends the battery life.

What is claimed is:

1. A battery protection device for a direct current power supply, comprising a monitoring unit, a direct current power supply, a chargeable battery unit, and load units, and further comprising: a first branch circuit unit and a second branch circuit unit which are connected with each other in parallel;
wherein, one end of the parallel connection is connected to said direct current power supply, and the other end of the parallel connection is connected in series with said load units through said chargeable battery unit; and
wherein, said first branch circuit unit comprises a second control unit and a first isolation unit that are connected in series, and said second branch circuit unit comprises a third control unit and a second isolation unit that are connected in series;
said first isolation unit and said second isolation unit are components which have characteristics of being conductive in a forward direction and cut-off in a reverse direction, and the conductive directions of said first isolation unit and said second isolation unit are opposite; when said direct current power supply supplies power normally, said first isolation unit is in a conductive state, and said second isolation unit is in a non-conductive state;
said monitoring unit, connected with said direct current power supply, said chargeable battery unit, said second control unit and said third control unit respectively, and used to monitor working states of said direct current power supply and said chargeable battery unit, and send control commands to said second control unit and said third control unit by following way:
when said monitoring unit detects that said direct current power supply supplies power normally and said chargeable battery unit is fully charged, controlling said second control unit to switch off and said third control units to switch on, to make said direct current power supply disconnect to said chargeable battery unit and supply power to said load units;
when said monitoring unit detects that said DC power supply supplies power abnormally, controlling both said second control unit and said third control units to switch on, to make said chargeable battery unit supply power to said load units.

2. The device of claim 1, wherein, said load units comprise primary loads and secondary loads, when said monitoring unit detects that a voltage of said chargeable battery unit drops to a voltage of a first power-down, said monitoring unit controls said chargeable battery unit to supply power only to said primary loads.

3. The device of claim 1, wherein, the device further comprises a first control unit, and said load units comprise a first load unit and a second load unit;
said first control unit and said first load unit constitute a series branch, one end of the series branch is connected to a negative electrode of said direct current power supply, and the other end of the series branch is connected to a positive electrode of said direct current power supply;
said one end of the parallel connection of said first branch circuit unit and said second branch circuit unit is connected to the negative electrode of said direct current power supply, and said the other end of the parallel connection of said first branch circuit unit and said second branch circuit unit is connected to a negative electrode of said chargeable battery unit;
a positive electrode of said chargeable battery unit is connected to the positive electrode of said direct current power supply;
one end of said second load unit is connected to said positive electrode of said direct current power supply, and the other end is connected to said negative electrode of said direct current power supply;
said monitoring unit is further used to send control commands to said first control unit.

4. The device of claim 3, wherein, said monitoring unit is further used to:
when determining that said direct current power supply supplies power normally and said chargeable battery unit is fully charged, control said first and third control units to switch on, and control said second control unit to switch off;

when determining that said direct current power supply stops supplying power and said chargeable battery unit supplies power, control said first, second and third control units to switch on together;

when determining that said direct current power supply stops supplying power and said chargeable battery unit is to be protected, control said first control unit to switch off and said second control unit to switch on, and control a state of said third control unit according to the voltage of said chargeable battery unit;

when determining that said direct current power supply supplies power normally and said chargeable battery unit is in charge, control said second control unit to switch on to make said direct current power supply charge said chargeable battery unit through said first branch circuit unit, and control states of said first and third control units according to the voltage of said chargeable battery unit.

5. The device of claim 3, wherein, said monitoring unit is also used to, when determining that said direct current power supply supplies power normally and said chargeable battery unit is fully charged, control said first and third control units to switch on, and determine a battery type of said chargeable battery unit, when said battery type is a type of supporting on-line floating charge, control said second control unit to switch off or switch on, and when said battery type is a type of not supporting on-line floating charge, control said second control unit to switch off.

6. The device of claim 4, wherein, said monitoring unit is further used to, when determining that said direct current power supply stops supplying power and said battery unit is to be protected, control the state of said third control unit according to the voltage of said chargeable battery unit by the following way:

when the voltage of said chargeable battery unit is between a voltage of a first power-down and a voltage of a second power-down, controlling said first control unit to switch off, and controlling said second and third control units to switch on, to make said chargeable battery unit not supply power to said first load unit; and when the voltage of said chargeable battery unit is lower than the voltage of the second power-down, then controlling said third control unit to switch off.

7. The device of claim 4, wherein, said monitoring unit is further used to, when determining that said direct current power supply supplies power normally and said chargeable battery unit is in charge, control states of said first and third control units according to the voltage of said chargeable battery unit by the following way:

when the voltage of said chargeable battery unit is lower than a voltage of a second power-down, controlling said first control unit to switch off to make said direct current power supply not supply power to said first load unit, and controlling said third control unit to switch off;

when the voltage of said chargeable battery unit is between a voltage of a first power-down and the voltage of said second power-down, controlling said first control unit to switch on to make said direct current power supply supply power to said first load unit, and controlling said third control unit to remain switched off;

when said chargeable battery unit is fully charged, controlling said first and third control units to switch on.

8. The device of claim 1, wherein, said control unit is a controllable switch, a mono-stable normally-closed direct current contactor, or a bi-stable direct current contactor.

9. A method for implementing battery protection with the battery protection device for the direct current power supply of claim 1, comprising:

when said monitoring unit detects that said direct current power supply supplies power normally and said chargeable battery unit is fully charged, controlling said second control unit to switch off and said third control units to switch on, to make said direct current power supply disconnect to said chargeable battery unit and supply power to said load units;

when said monitoring unit detects that said DC power supply supplies power abnormally, controlling both said second control unit and said third control units to switch on, to make said chargeable battery unit supply power to said load units.

10. The method of claim 9, wherein, said load units comprise: primary loads and secondary loads;

said method further comprising:

when said monitoring unit detects that the voltage of said chargeable battery unit drops to a voltage of a first power-down, controlling said chargeable battery unit to supply power only to said primary loads.

* * * * *